(12) United States Patent
Cornell et al.

(10) Patent No.: US 6,704,499 B1
(45) Date of Patent: Mar. 9, 2004

(54) CAMERA WITH FRAME COUNTER

(75) Inventors: David J. Cornell, Scottsville, NY (US); Anthony DiRisio, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/302,578

(22) Filed: Nov. 22, 2002

(51) Int. Cl.$^7$ .................................................. G03B 1/66
(52) U.S. Cl. ........................................... 396/6; 396/284
(58) Field of Search ..................................... 396/6, 284

(56) References Cited

U.S. PATENT DOCUMENTS

| | | |
|---|---|---|
| 2,522,387 A | 9/1950 | Livens |
| 3,073,229 A | 1/1963 | Mädge |
| 3,678,834 A | 7/1972 | Melillo |
| 3,722,386 A | 3/1973 | Furuta |
| 4,918,485 A | 4/1990 | Ishii et al. |
| 5,541,690 A | 7/1996 | Petruchik |

*Primary Examiner*—David M. Gray
(74) *Attorney, Agent, or Firm*—Roger A. Fields

(57) ABSTRACT

A camera includes a frame counter having a single numerical scale of frame count indicia capable of being successively viewed after each picture is taken. The frame count indicia are arranged in one column in which the indicia are only odd numbers and are arranged in another column in which the indicia are only even numbers. An indicia viewing change-over is movable from one column to another after each picture is taken, to alternately view an odd number in one column or an even number in another column.

19 Claims, 12 Drawing Sheets

CAMERA WITH FRAME COUNTER

FIELD OF THE INVENTION

The invention relates generally to cameras such as so-called single-use or one-time-use cameras, and in particular to a camera with a frame counter for providing a visible frame count.

BACKGROUND OF THE INVENTION

General

Film and cameras that are all in one, commonly referred to as disposable single-use or one-time-use cameras, have become well known. The one-time-use camera is a simple point-and-shoot type camera comprising a conventional film cartridge within a cartridge receiving chamber in a main body part, an unexposed film roll prewound from the film cartridge onto a film supply spool within a film supply chamber in the main body part, a film-exposing backframe opening between the cartridge receiving and film supply chambers in the main body part, a fixed-focus taking lens, a manually rotatable film winding thumbwheel coaxially engaged with a film winding spool inside the film cartridge, a single-blade shutter, a manually depressible shutter release button, a frame counter wheel that has a single numerical scale of frame count indicia arranged in one column and is incrementally rotated to successively view the frame count indicia, an anti-backup pawl that engages the frame counter wheel to prevent its reverse rotation, a direct see-through viewfinder having front and rear viewfinder lenses, and in some models an electronic flash. A pair of separate front and rear cover parts house the main body part between them to complete the camera. The rear cover part connects to the main body part and/or to the front cover part to make the main body part light-tight. A decorative cardboard outer box or label at least partially covers the front and rear cover parts and has respective openings for the taking lens, etc.

To take a picture, the shutter release button is manually depressed. This causes a spring-urged high-energy lever to be released to strike the shutter blade, which then pivots open to uncover an exposure aperture. A return spring connected to the shutter blade pivots the shutter blade closed to re-cover the exposure aperture. Also, a metering lever is pivoted out of spring-biased. engagement with the thumbwheel in order to permit manual rotation of the thumbwheel in the film winding direction after the picture is taken. When the thumbwheel is rotated in a film winding direction, it similarly rotates the film winding spool inside the film cartridge to wind an exposed frame of the filmstrip from the backframe opening into the film cartridge and advance an unexposed frame of the filmstrip from the unexposed film roll to the backframe opening. The rewinding movement of the filmstrip the equivalent of slightly more than one frame width rotates a metering sprocket in engagement with successive perforations in the filmstrip, to in turn incrementally rotate the frame counter wheel to view its next lower-numbered indicia. Also, the high energy lever is re-cocked or re-set and the metering lever is pivoted into re-engagement with the thumbwheel. When the metering lever re-engages the thumbwheel, further manual rotation of the thumbwheel in the film winding direction is prevented and the camera is ready to take another picture.

When the maximum number of frames available on the filmstrip have been exposed and the filmstrip is completely wound into the film cartridge, the one-time-use camera is given to a photofinisher who breaks away a cover door portion of the rear cover part from the main body part and removes the film cartridge with the exposed filmstrip from the cartridge receiving chamber. Then, he removes the exposed filmstrip from the film cartridge to develop the latent images and make prints for the customer.

Prior Art Problem Regarding Frame Counter

A one-time-use camera should be compact enough to fit in one's pocket. However, the frame counter wheel must be large enough so that its number scale of frame count indicia can be readily viewed.

SUMMARY OF THE INVENTION

Generally speaking, a camera with a frame counter having a single numerical scale of frame count indicia capable of being successively viewed after each picture is taken, is characterized in that:

the frame count indicia are arranged in multiple columns to permit one of the indicia to be viewed after another when switching from one column to another after each picture is taken; and an indicia viewing change-over is movable from one column to another after each picture is taken, to view one of said frame count indicia after another.

More specifically, a camera with a frame counter having a single numerical scale of frame count indicia capable of being successively viewed after each picture is taken, is characterized in that:

the frame count indicia are arranged in one column in which the indicia are only odd numbers and are arranged in another column in which the indicia are only even numbers; and an indicia viewing change-over is movable from one column to another after each picture is taken, to alternately view an odd number in one column or an even number in another column.

Since the frame count indicia are arranged in at least two columns, the frame counter, e.g. when a wheel, can be relatively small, or conversely can have a large number of frame count indicia

DETAILED DESCRIPTION OF THE INVENTION

The invention is disclosed as being embodied preferably in a disposable one-time-use camera. Because the features of a one-time-use camera unit are generally known, the description which follows is directed in particular only to those elements forming part of or cooperating directly with the disclosed embodiment. It is to be understood, however, that other elements may take various forms known to a person of ordinary skill in the art.

Figure 1:
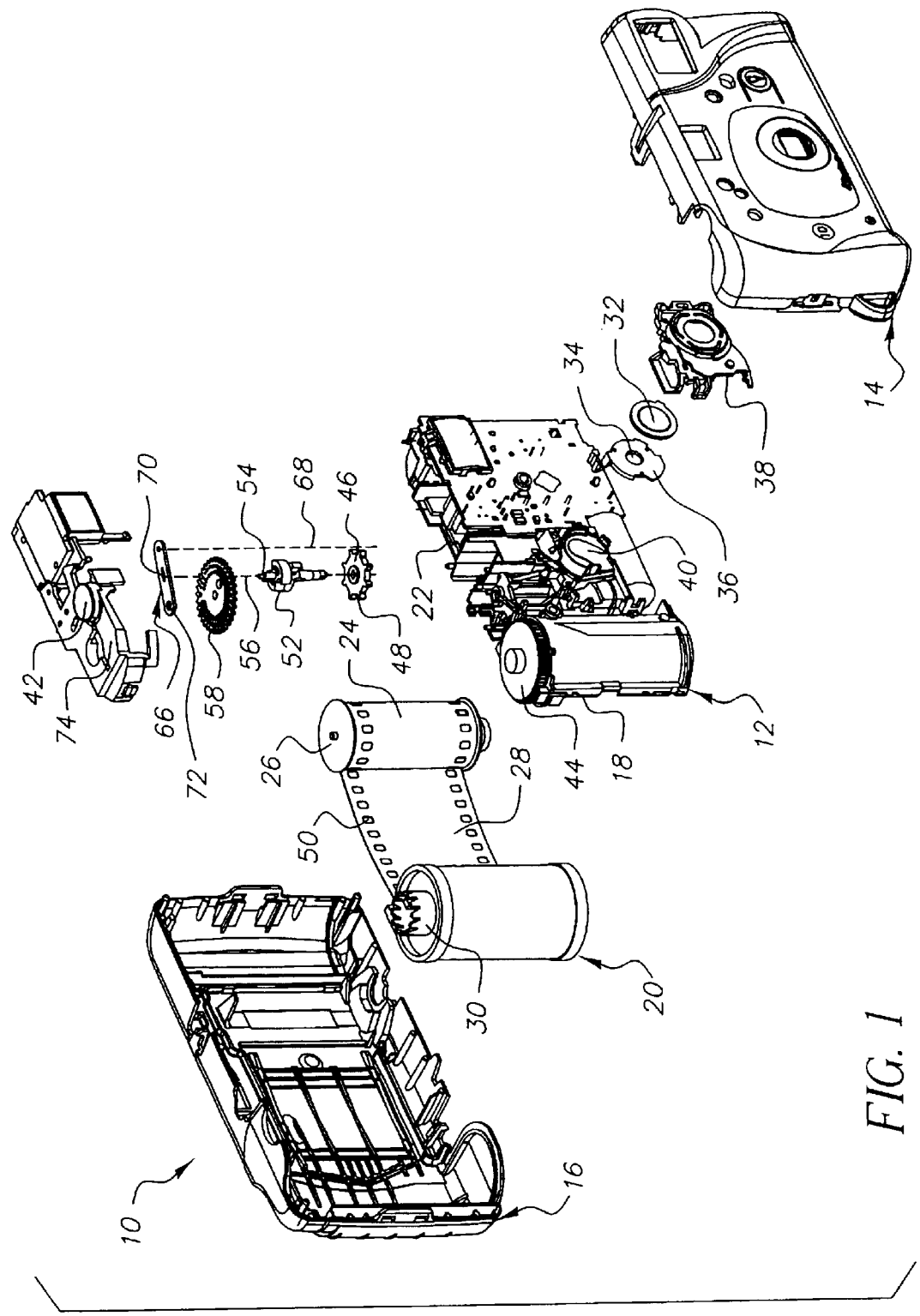
FIG. 1 is an exploded front perspective view of a one-time-use camera including a frame counter and drive mechanism according to one embodiment of the invention.
Figure 7:
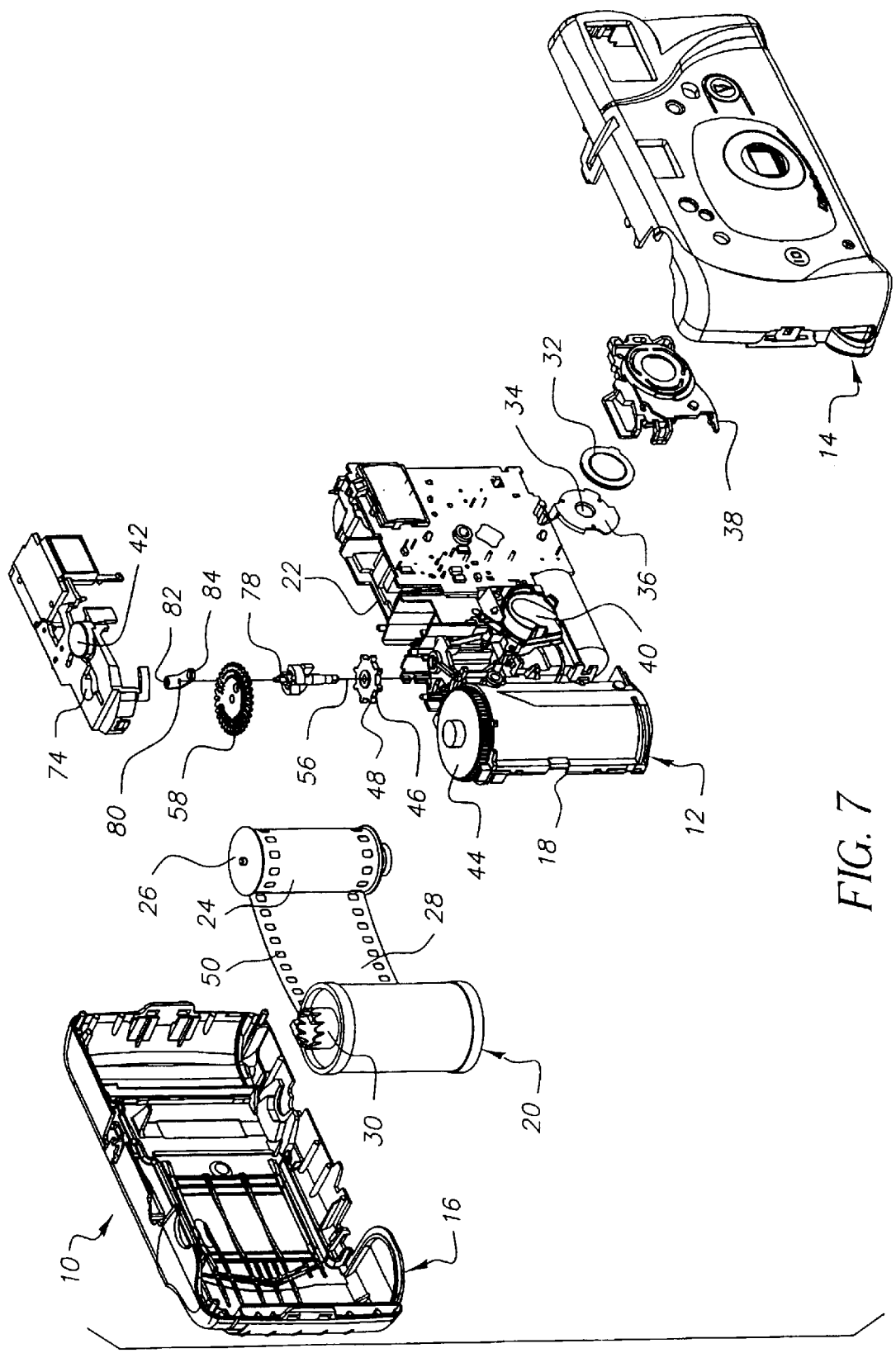
FIG. 7 is an exploded front perspective view of a one-time-use camera including a frame counter and drive mechanism according to another embodiment of the invention.
Figure 8:
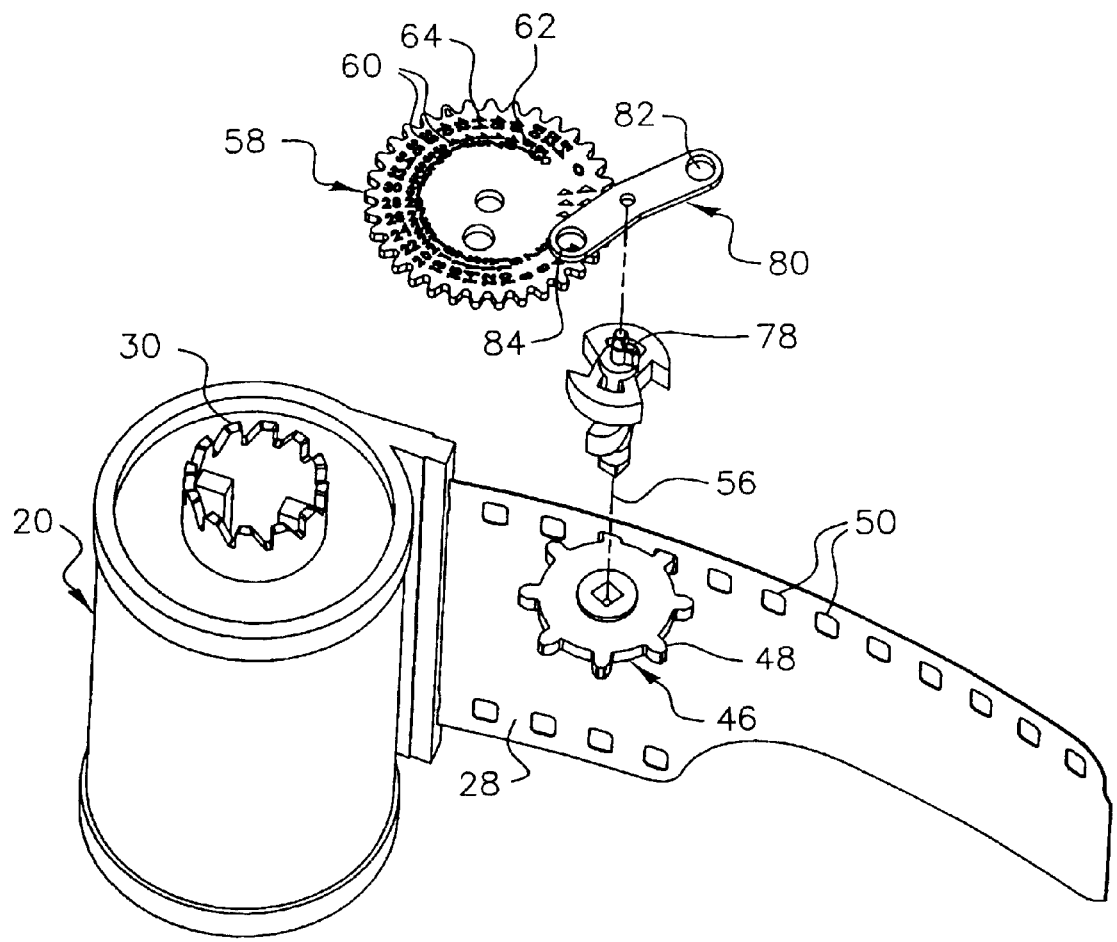
FIG. 8 is an enlarged view of the frame counter and drive mechanism shown in FIG. 7.

Referring now to the drawings, FIGS. 1 and 7 show a disposable one-time-use camera 10 including an opaque main body part 12, an opaque front cover part 14, and an opaque exterior rear cover part 16. The front cover part 14 and the rear cover part 16 house the main body part 12 between them and are connected releasably to one another and to the main body part 12 via known-type hook-in-hole and other connections.

As is typical, the main body part 12 has a rearwardly open cartridge receiving chamber 18 for a 35 mm film cartridge 20 and a rearwardly open film supply chamber 22 for an unexposed film roll 24 on a rotatable film supply spool 26. See FIGS. 1 and 7. During assembly of the camera 10, an unexposed filmstrip 28 is substantially prewound from a rotatable film winding spool 30 in the film cartridge 20 and into the unexposed film roll 24 on the film supply spool 26. A rearwardly open backframe opening (not shown) in the main body part 12 is located between the cartridge receiving chamber 18 and the film supply chamber 22 for exposing successive frames of the filmstrip 28 when ambient light is received through a front fixed-focus taking lens 32, a fixed aperture 34 in a plate 36, and a frontwardly open exposure opening (not shown) in the main body part. The taking lens 32 and the plate 36 are held on the main body part 12, over the exposure opening, via a retainer 38. A shutter blade 40 is pivotally mounted on the main body part 12, beneath the fixed aperture 34 and the exposure opening. The shutter blade 40 is pivoted open to momentarily uncover the exposure opening and the aperture opening 34 when a shutter release button 42 is manually depressed, and is spring-biased closed to recover them.

Figure 2:
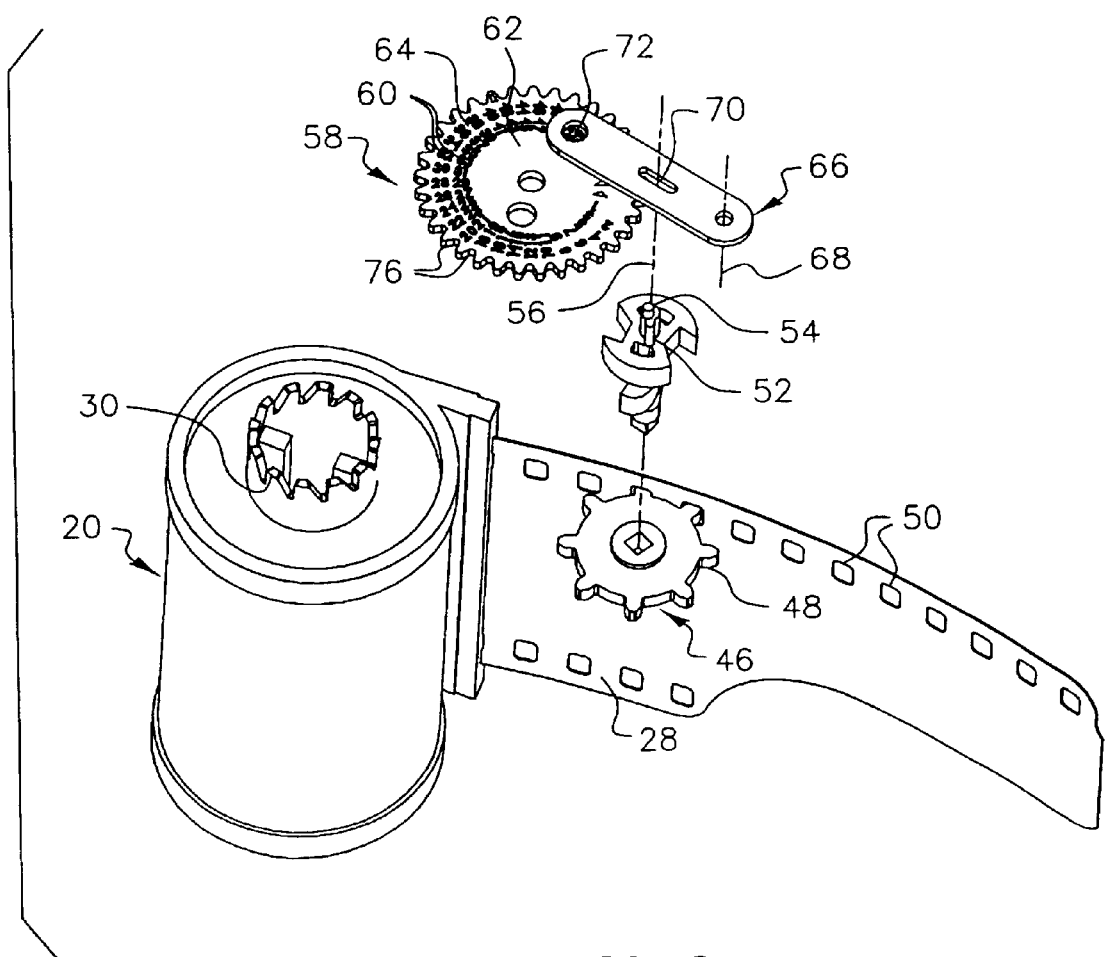
FIG. 2 is an enlarged view of the frame counter and drive mechanism shown in FIG. 1.

A film winding thumbwheel 44, rotatably supported on the main body part 12, coaxially engages the film winding spool 30 in the film cartridge 20 and peripherally protrudes from an elongate narrow opening (not shown) in the rear cover part 16. See FIGS. 1 and 7. When the thumbwheel 44 is manually rotated in a film winding direction, i.e. counter-clockwise in FIGS. 1 and 7, it similarly rotates the film winding spool 30. This is done in order to wind an exposed frame of the filmstrip 28 into the film cartridge 20 after a picture is taken, and to move a fresh frame of the filmstrip from the unexposed film roll 24 to between the backframe opening and the exposure opening. The winding movement of the filmstrip 28 the equivalent of slightly more than one frame width rotates a metering sprocket 46, rotatably supported on the main body part 12 and having respective peripheral teeth 48 in engagement with successive perforations 50 in the filmstrip, a half-revolution, i.e. 180°. See FIGS. 2 and 7.

Embodiment 1

In FIGS. 1–6, the metering sprocket 46 is co-axially connected to an integral actuator tab 52 and cam pin 54 along an axis 56. A frame counter wheel 58, rotatably supported on the main body part 12, has a numerical scale 60 of frame count numbers divided into only successive odd numbers "1", "3", "5", "7", . . . "53" arranged in an inner curved column 62 and only successive even numbers "0", "2", "4", "6", . . . "54" arranged in an outer curved column 64. A number or indicia viewing change-over 66, pivotally supported on the main body part 12 along an axis 68, has a slot 70 into which the cam pin 54 projects, and has a single odd number/even number viewing window 72 for alternately viewing an odd number in the odd numbered column 62 or an even number in the even numbered column 64 after each picture is taken. The alternate viewing of an odd or even number is done through a top viewing hole 74 shown in FIG. 1.

Figure 3:
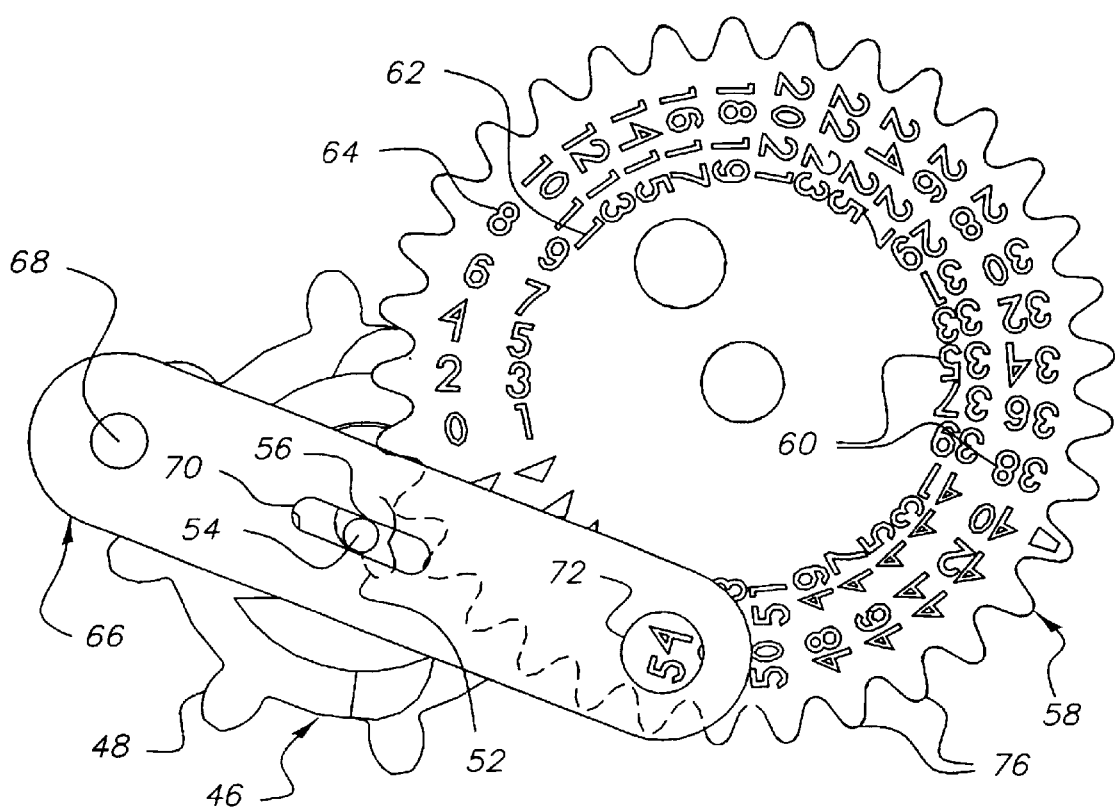
FIGS. 3–6 are plan views of the frame counter and drive mechanism depicting their operation.
Figure 4:
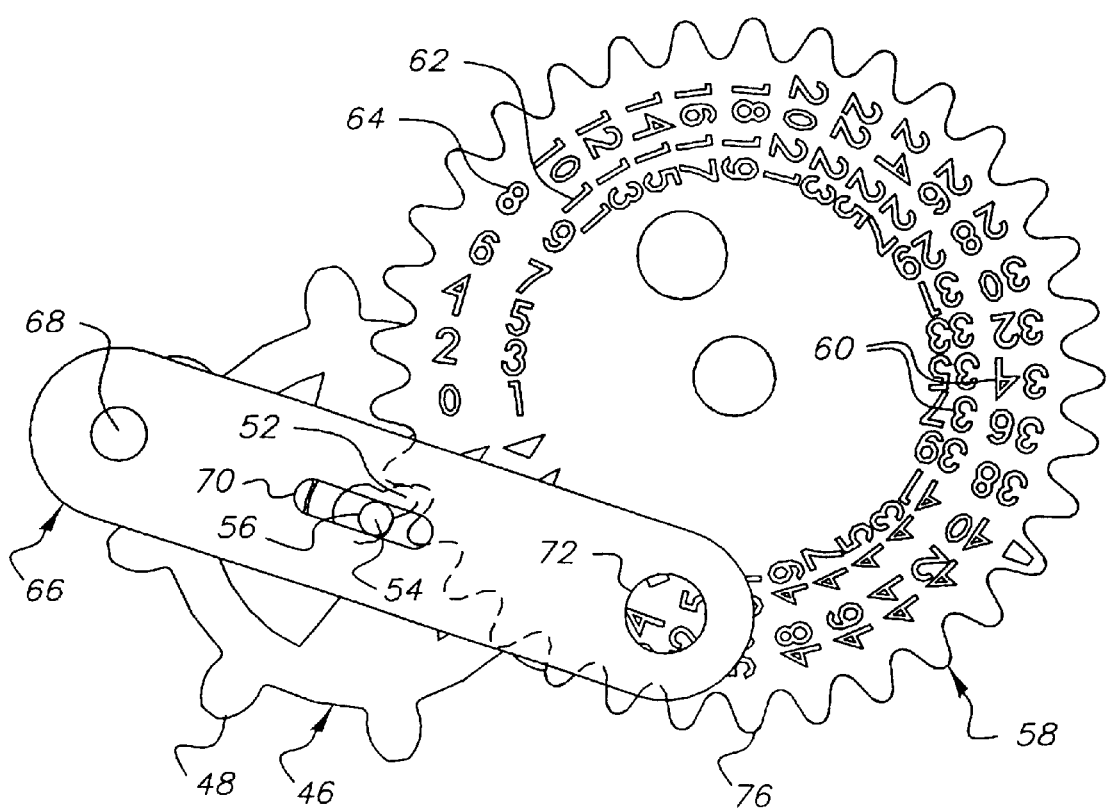
Figure 5:
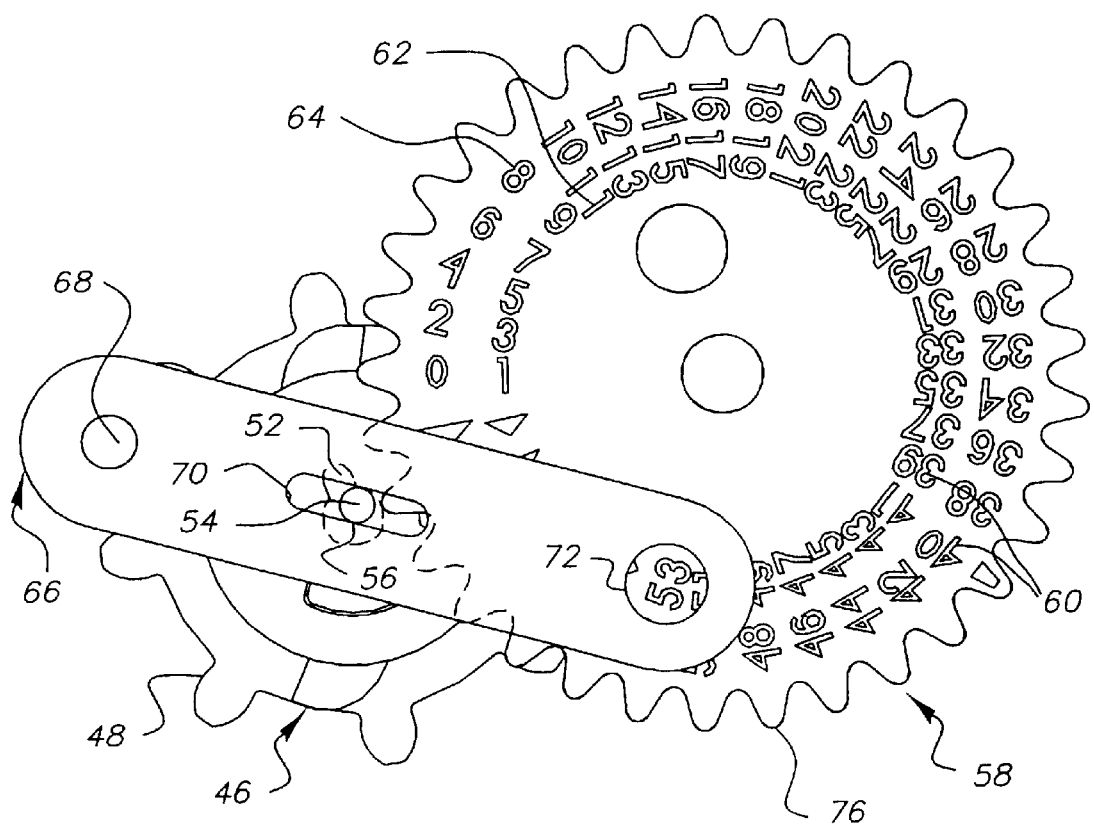

Going from FIGS. 3–5, it can be seen that when the winding movement of the filmstrip 28 the equivalent of slightly more than one frame width rotates the metering sprocket 46 counterclockwise 180°, the actuator tab 52 and the cam pin 54 are similarly rotated about the axis 56. In this instance, the actuator tab 52 temporarily engages any one of the peripheral teeth 76 of the frame counter wheel 58 to incrementally rotate or index the wheel clockwise in FIGS. 4 and 5 to the next lower-number setting. At the same time, the cam pin 54 pivots the number viewing change-over 66 counterclockwise 6° about the axis 68 to switch the odd number/even number viewing window 72 from being over the even number "54" in the even numbered column 64 in FIG. 3 to over the odd number "53" in the odd numbered column 62 in FIG. 5.

Figure 6:
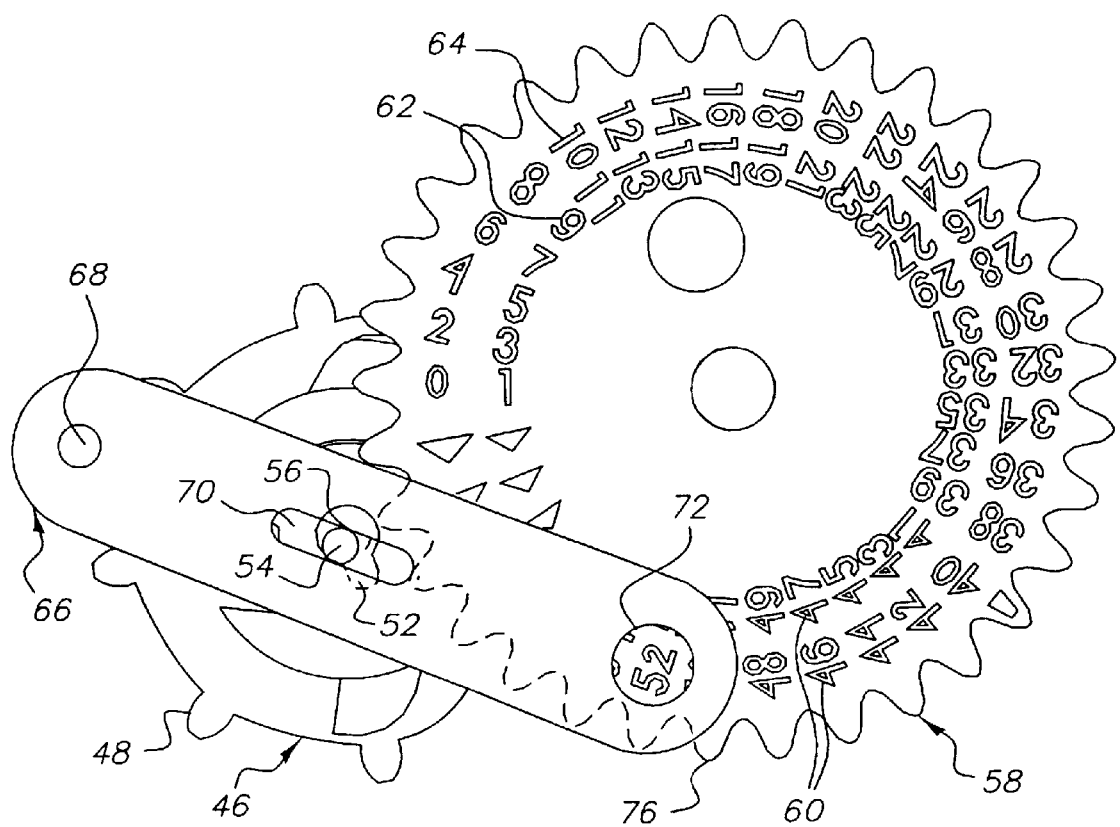

Going from FIGS. 5–6, it can be seen that when the winding movement of the filmstrip 28 the equivalent of slightly more than one frame width rotates the metering sprocket 46 counterclockwise 180°, the actuator tab 52 and the cam pin 54 are similarly rotated about the axis 56. In this instance, the actuator tab 52 does not engage any one of the peripheral teeth 76 of the frame counter wheel 58 to incrementally rotate the wheel as in FIGS. 4 and 5 to the next lower-number setting. Instead, the wheel 58 remains in place. At the same time, the cam pin 54 pivots the number viewing change-over 66 clockwise 6° about the axis 68 to switch the odd number/even number viewing window 72 from being over the odd number "53" in the odd numbered column 63 in FIG. 4 to over the even number "52" in the even numbered column 64 in FIG. 6.

Thus, it will be realized that the frame counter wheel 58 is periodically connected to the metering sprocket 46 via the actuator tab 52 to be incrementally rotated every other time the metering sprocket is rotated 180°. On the other hand, the number viewing change-over is pivoted 6° every time the metering sprocket is rotated 180°.

Embodiment 2

In FIGS. 7–12, the metering sprocket 46 is co-axially connected to an actuator tab 78 and a number or indicia viewing change-over 80 along the axis 56. The frame counter wheel 58 is the same as in FIGS. 1–6. The number viewing change-over 80 is different than in FIGS. 1–6 in that, besides being co-axially connected to the metering sprocket 46, it has an odd number viewing window 82 and an even number viewing window 84 for respectively viewing an odd number in the odd numbered column 62 and an even number in the even numbered column 64. The odd number viewing window 82 and the even number viewing window 84 are spaced the same distance from the axis 56

Figure 9:
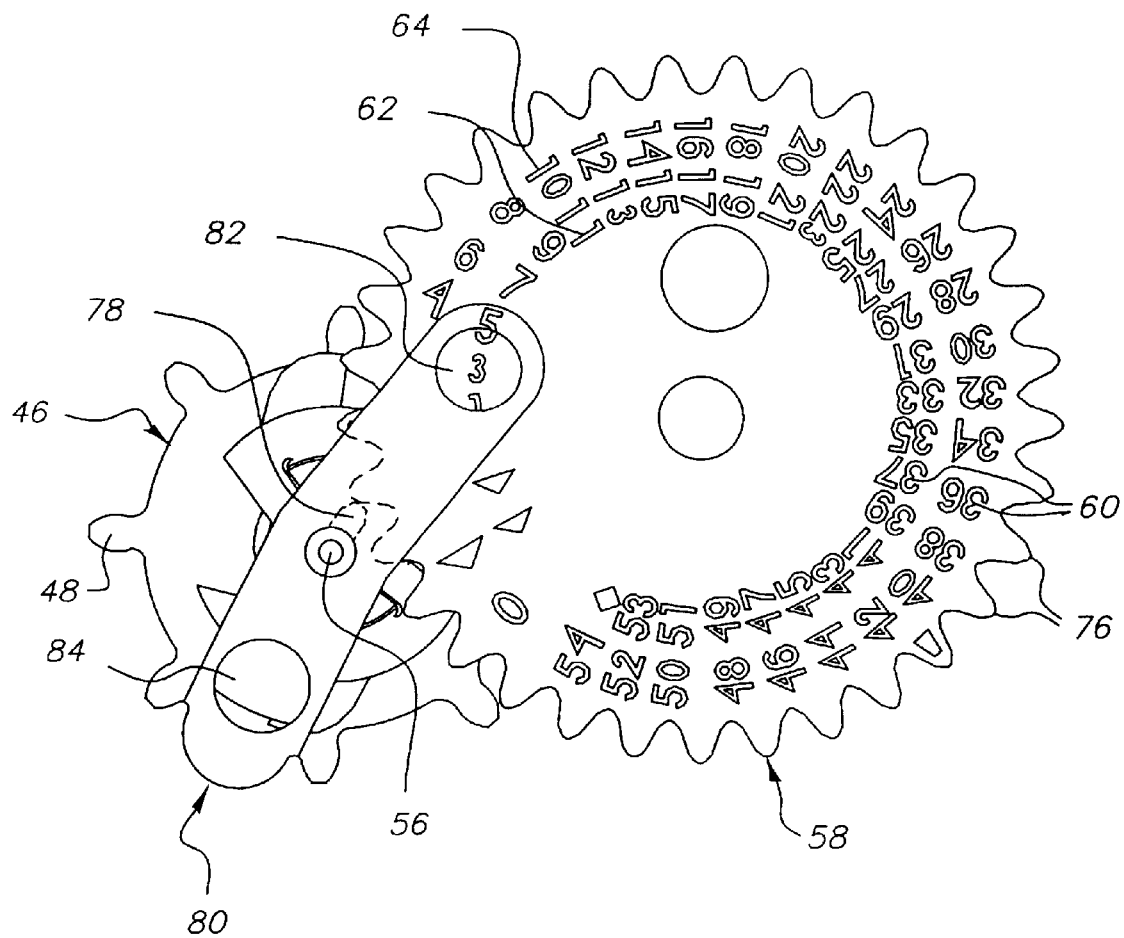
Figure 10:
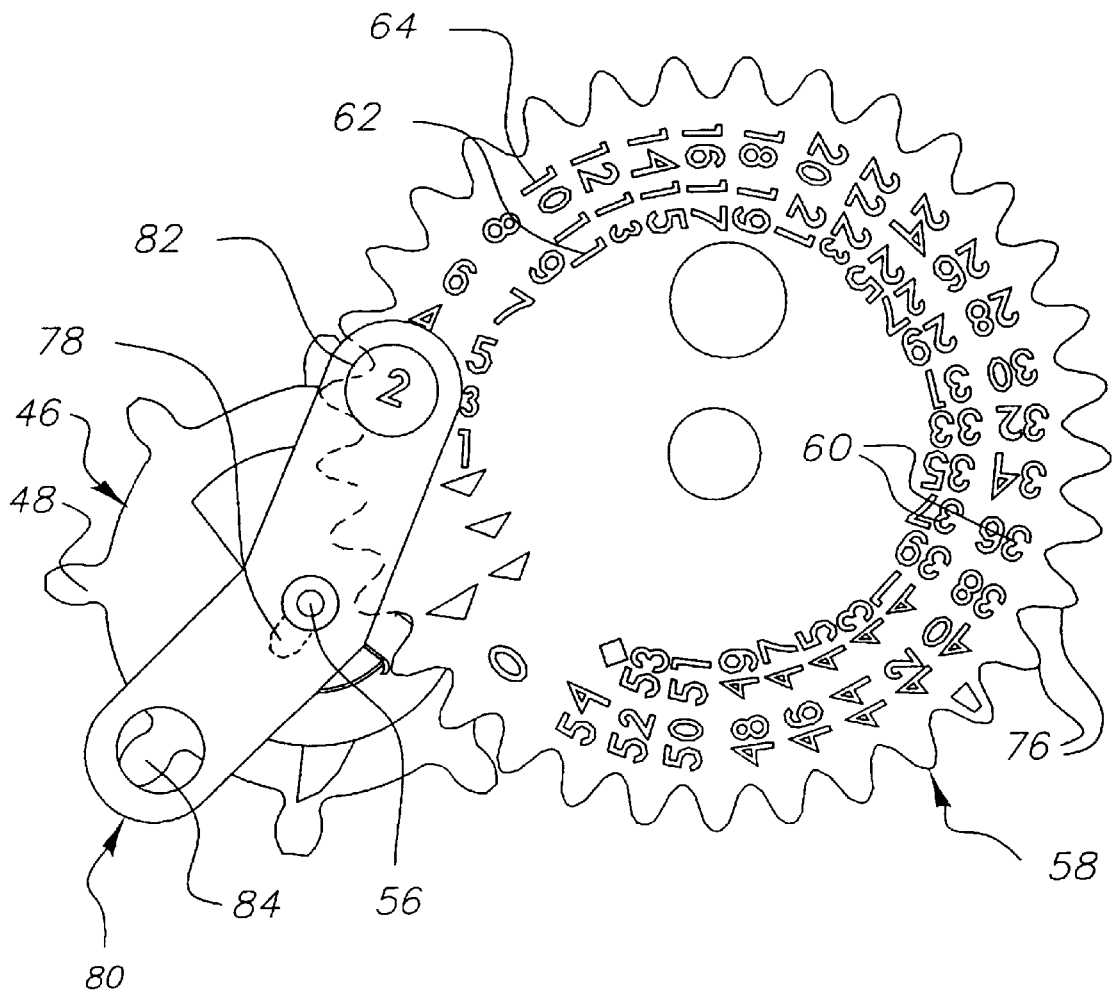
FIGS. 10–12 are plan views of the frame counter and drive mechanism depicting their operation.

Going from FIGS. 9–10, it can be seen that when the winding movement of the filmstrip 28 the equivalent of slightly more than one frame width rotates the metering sprocket 46 counterclockwise 180°, the actuator tab 78 and the number viewing change-over 80 are similarly rotated about the axis 56. In this instance, the actuator tab 78 does not engage any one of the peripheral teeth 76 of the frame counter wheel 58 to incrementally rotate the wheel as in FIGS. 4 and 5 to the next lower-number setting. Instead, the wheel 58 remains in place. At the same time, the number viewing change-over 80 is rotated counterclockwise 180° about the axis 56 to switch the odd number viewing window 82 from being over the odd number "3" in the odd numbered column 62 in FIG. 9 to over the even number "2" in the even numbered column 64 in FIG. 10.

Figure 11:
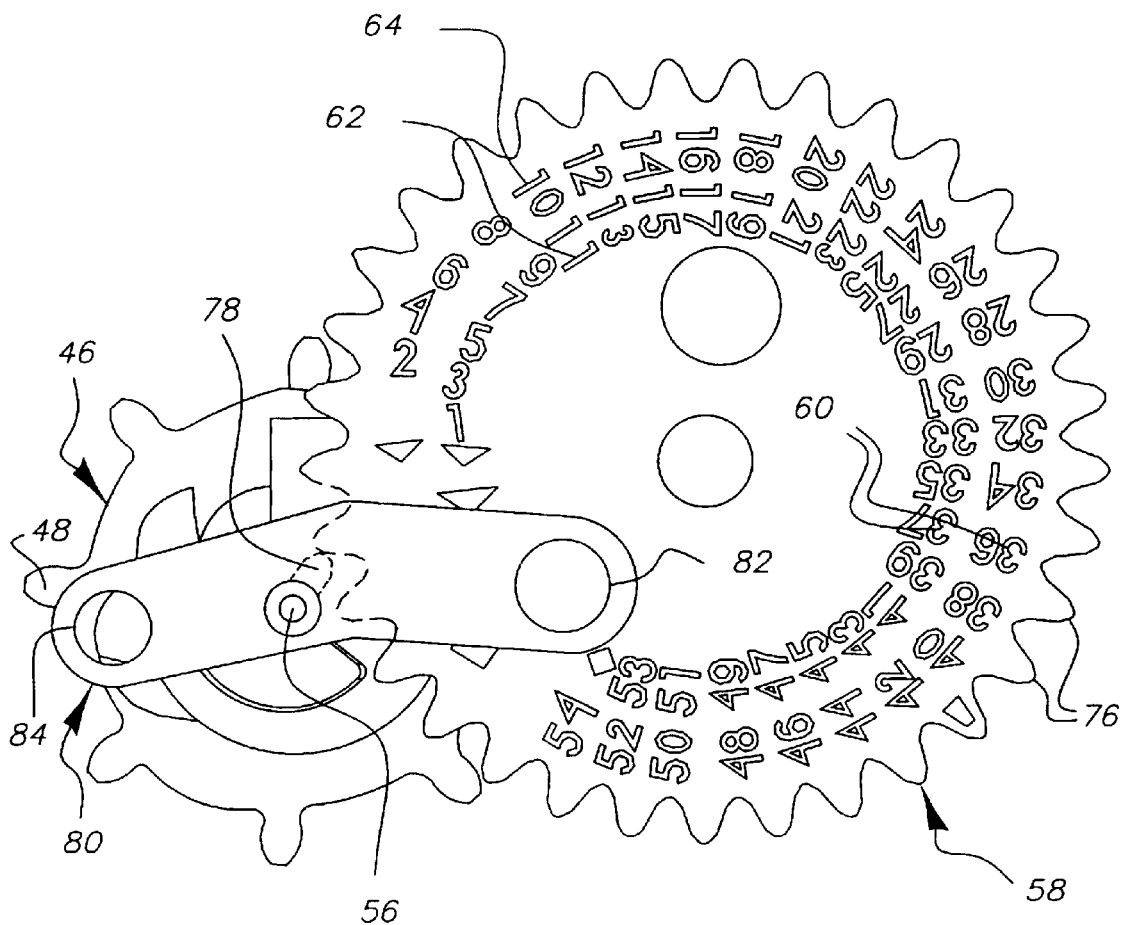
Figure 12:
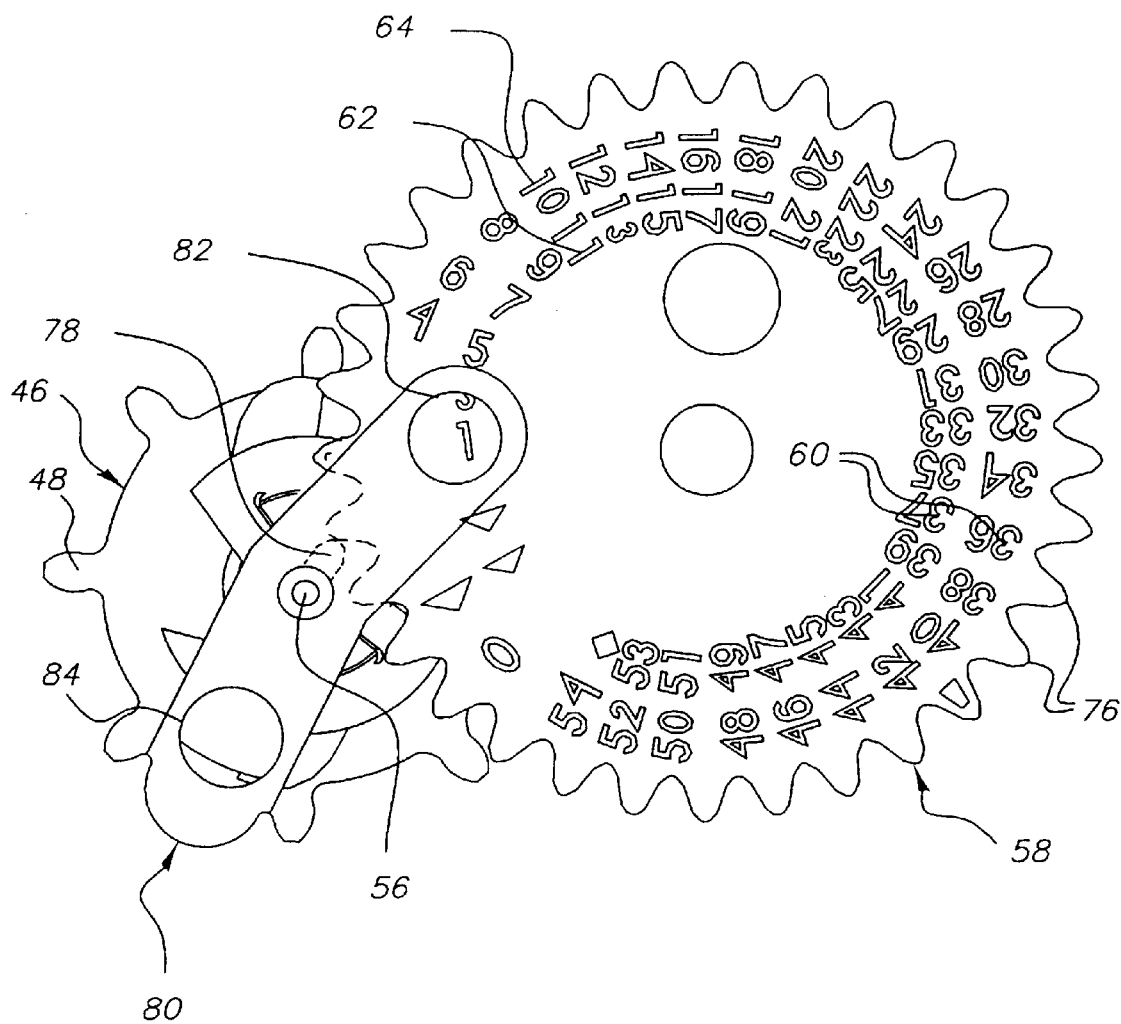

Going from FIGS. 10–12, it can be seen that when the winding movement of the filmstrip 28 the equivalent of slightly more than one frame width rotates the metering sprocket 46 counterclockwise 180°, the actuator tab 78 and the numbered viewing changeover 80 are similarly rotated about the axis 56. In this instance, the actuator tab 78 temporarily engages any one of evenly spaced peripheral teeth 76 of the frame counter wheel 58 to incrementally rotate the wheel clockwise in FIGS. 11 and 12 to the next lower-number setting. At the same time, the number viewing change-over 80 is rotated counterclockwise 180° about the axis 56 to switch the even number viewing window 84 from being over the even number "3" in the even numbered column 64 in FIG. 10 to over the odd number "1" in the odd numbered column 62 in FIG. 12.

The invention has been described in detail with particular reference to certain preferred embodiments thereof, but it will be understood that variations and modifications can be effected within the spirit and scope of the invention. For example, instead of the frame counter wheel 58 being incrementally rotated to the next-lower number setting, it can be reverse rotated to the next-number higher setting. Also, instead of the odd numbered column 62 and the even numbered column 64, there may be three or more columns of numbers, e.g. odd-even odd or even-odd-even, which would require the number viewing change-over 66 or 80 to be modified.

PARTS LIST 10. one-time-use camera
12. main body part
14. front cover part
16. rear cover part
18. cartridge receiving chamber
20. film cartridge
22. film supply chamber
24. unexposed film roll
26. film supply spool
28. unexposed filmstrip
30. film winding spool
32. taking lens
34. fixed aperture
36. plate
38. retainer
40. shutter blade
42. shutter release button
44. thumbwheel
46. metering sprocket
48. teeth
50. perforations
52. actuator tab
54. cam pin
56. axis
58. frame counter wheel
60. numerical series of frame count numbers or indicia
62. odd numbered column
64. even numbered column
66. number viewing change-over
68. axis
70. slot
72. odd number/even number viewing window
74. viewing hole
76. teeth
78. actuator tab
80. number viewing change-over
82. odd number viewing window
84. even number viewing window

What is claimed is:

1. A camera with a frame counter having a single numerical scale of frame count indicia capable of being successively viewed after each picture is taken, is characterized in that:
   said frame count indicia are arranged in multiple columns to permit one of the indicia to be viewed after another when switching from one column to another after each picture is taken; and
   an indicia viewing change-over is movable from one column to another after each picture is taken, to view one of said frame count indicia after another.

2. A camera as recited in claim 1, wherein said frame counter is incrementally rotated relative to said indicia viewing change-over only after at least every other picture is taken.

3. A camera as recited in claim 1, wherein said frame count indicia are arranged in two columns and have only successive odd numbers in one column and only successive even numbers in another column.

4. A camera as recited in claim 3, wherein said indicia viewing change-over is movable to alternately view an odd number in one column or an even number in another column after each picture is taken.

5. A camera as recited in claim 4, wherein said indicia viewing change-over has one window for viewing an odd number in one column and another window for viewing an even number in another column.

6. A camera as recited in claim 5, wherein said indicia viewing change-over is pivoted 180° about an axis after each picture is taken to switch said windows for viewing an odd number in one column and for viewing an even number in another column.

7. A camera as recited in claim 6, wherein said windows are spaced the same distance along said indicia viewing change-over from said axis.

8. A camera as recited in claim 6, wherein a metering sprocket has teeth in engagement with successive perforations in a filmstrip to be rotated 180° when the filmstrip is advanced after each picture is taken, and said indicia viewing change-over is co-axially connected to said metering sprocket to be pivoted 180° after each picture is taken.

9. A camera as recited in claim 8, wherein said frame counter is periodically connected to said metering sprocket to be incrementally rotated relative to said indicia viewing change-over every other time said metering sprocket is rotated 180°.

10. A camera as recited in claim 4, wherein said indicia viewing change-over has a single window for alternately viewing an odd number in one column and an even number in another column.

11. A camera as recited in claim 10, wherein said indicia viewing change-over is pivoted substantially less than 180° about an axis after each picture is taken to move said window for alternately viewing an odd number in one column and an even number in another column.

12. A camera recited in claim 11, wherein a metering sprocket has teeth in engagement with successive perforations in a filmstrip to be rotated 180° when the filmstrip is advanced after each picture is taken, and said indicia viewing change-over is connected off-axis to said metering sprocket to be pivoted substantially less than 180° after each picture is taken.

13. A camera with a frame counter having a single numerical scale of frame count indicia capable of being successively viewed after each picture is taken, is characterized in that:

said frame count indicia are arranged in one column in which the indicia are only odd numbers and are arranged in another column in which the indicia are only even numbers; and an indicia viewing change-over is movable from one column to another after each picture is taken, to alternately view an odd number in one column or an even number in another column.

14. A camera as recited in claim 13, wherein said indicia viewing change-over has an odd number viewing window for viewing an odd number in one column and an even number viewing window for viewing an even number in another column.

15. A camera as recited in claim 13, wherein said indicia viewing change-over has a single odd number/even number viewing window for alternately viewing an odd number in one column and an even number in another column.

16. A method in a camera of using a frame counter that has a single numerical scale of frame count indicia capable of being successively viewed after each picture is taken, is characterized by:

providing the frame count indicia in multiple columns to permit one of the indicia to be viewed after another when switching from one column to another after each picture is taken; and moving an indicia viewing change-over from one column to another after each picture is taken, to view one of the frame count indicia after another.

17. A method as recited in claim 16, is characterized by:

incrementally rotating the frame counter relative to the indicia viewing change-over only after at least every other picture is taken.

18. A method as recited in claim 16, wherein the indicia viewing change-over is moved to alternately view an odd number in one column or an even number in another column after each picture is taken.

19. A method in a camera of using a frame counter that has a single numerical scale of frame count indicia capable of being successively viewed after each picture is taken, is characterized by:

providing the frame count indicia as only successive odd numbers in one column and only successive even numbers in another column; and moving an indicia viewing change-over from one column to another after each picture is taken, to alternately view an odd number in one column or an even number in another column.

* * * * *